Sept. 16, 1958  J. M. SMITH  2,851,851

PRESSURE-CHARGED INTERNAL COMBUSTION ENGINES

Filed Oct. 25, 1954

United States Patent Office 2,851,851
Patented Sept. 16, 1958

2,851,851

PRESSURE-CHARGED INTERNAL COMBUSTION ENGINES

James Millar Smith, Preston, England, assignor to The English Electric Company Limited, London, England, a British company Application October 25, 1954, Serial No. 464,553

Claims priority, application Great Britain November 6, 1953

6 Claims. (Cl. 60—13)

The invention relates to pressure-charged internal combustion engines of the four-stroke cycle type.

In conventional four-stroke cycle internal combustion engines with exhaust gas turbine driven pressure-chargers the mechanically operated inlet valve of each cylinder is arranged to open before the inner dead center of the exhaust stroke and to close after the outer dead center on the compression stroke, while the exhaust valve, also mechanically operated, of each cylinder is arranged to open before the outer dead center on the expansion stroke and to close after the inner dead center on the suction stroke. The compression ratio of such an engine is determined by the arc from the closure of the inlet valve to the inner dead center, and the expansion ratio by the arc from the inner dead center to the opening of the exhaust valve in the respective strokes, while the interval between the opening of the inlet valve and the closure of the exhaust valve, when the piston is near the inner dead center, constitutes the valve overlap period during which scavenging of the exhaust gases in the clearance volume of the cylinder is effected by compressed air from the pressure-charger. This scavenging has a beneficial effect on the re-charging of the engine cylinder and also on the operating conditions for the exhaust gas turbine driven pressure-charger owing to the cooling effect of the scavenging air discharged into the exhaust system.

It is well known, however, that with exhaust gas turbine driven pressure-chargers applied to compression ignition engines the boost pressure increases with an increase of the engine load. While the compression ratio of such an engine must be high enough to ensure easy starting with atmospheric charging of the cylinder (since the pressure-charger is not then in operation), the compression ratio must be low enough to obviate unduly high maximum cylinder pressures at full load. This difficulty becomes more acute with increase of specific engine output through the use of higher boost pressures.

According to the present invention, a pressure-charged internal combustion engine is operated at starting and at low load operation at a comparatively low expansion ratio and comparatively high compression ratio, and at normal and at full load operation at a comparatively high expansion ratio and comparatively low compression ratio.

A high expansion ratio at normal or full load operation is conducive to high thermal efficiency, while a low compression ratio keeps the maximum cylinder pressure within manageable limits even at full load.

With a mechanically driven pressure-charger the air charge per cycle is substantially constant whereas when an exhaust turbine driven pressure-charger is employed, the mass flow of air from the pressure-charger depends on the energy available to the gas turbine and, as the said energy increases, it is found that the discharge pressure of the pressure-charger can rise considerably over the back pressure which the turbine imposes. It is, therefore, practicable when increasing the load to reduce the interval between exhaust valve and inlet valve opening, and it is desirable to increase the period between inlet valve and exhaust valve closing in order that some of the charge air should sweep through the cylinders for internal cooling and to reduce the mean operating temperature of the gas turbine.

With four-stroke cycle internal combustion engines the closing of the exhaust valve at the beginning of the suction stroke and the opening of the exhaust valve during the outer part of the expansion stroke are retarded, and the opening of the inlet valve towards the inner end of the exhaust stroke and the closing of the inlet valve adjacent the outer dead center between the suction and compression stroke are advanced at normal and high load operation as compared with starting and low load operation.

The valve period between opening and closing of the exhaust valve and inlet valve respectively may be kept constant.

Separate cam-shafts may be used for the exhaust valve and inlet valve respectively, each of the said cam-shafts being geared to the crankshaft of the engine through a phase unit controlled by the engine speed governor or manually, the cam shaft for the exhaust valve being retarded relative to said crankshaft while the cam-shaft for the inlet valve is advanced, and vice versa.

Alternatively the inlet and exhaust valves may be operated through a common cam-shaft or two cam-shafts fixedly geared to one another by means of cam followers which are adjustable about their respective cams and connected with one another in such a manner that they are moved in opposite directions whereby the timing of the inlet valve is advanced while that of the exhaust valve is retarded and vice versa. These two cam followers may be fulcrumed on a common adjustment shaft operated by the engine speed governor or manually, the eccentricities for the two cam followers being offset with respect to one another.

In order that the invention may be clearly understood and readily carried into effect, the same will now be explained with reference to the accompanying drawings in which:

Fig. 1 is a timing diagram of a conventional four-stroke cycle internal combustion engine, Fig. 2 is a timing diagram of a four-stroke cycle engine according to the invention at starting or low load operation, Fig. 3 is a timing diagram of a four-stroke cycle engine according to the invention at normal or full load operation, Fig. 4 shows diagrammatically a cylinder of a four-stroke cycle internal combustion engine with separate cam-shafts for the inlet valve and for the exhaust valve.

Figure 1:
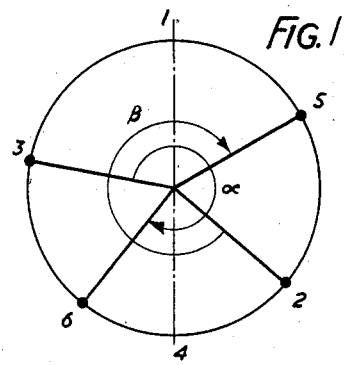

Referring to Fig. 1, the following reference numerals are used:

1 is the inner dead center, 2 is the opening of the exhaust valve in the expansion stroke, 3 is the opening of the inlet valve in the exhaust stroke, 4 is the outer dead center, 5 is the closing of the exhaust valve in the suction stroke, and 6 is the closing of the inlet valve at the compression stroke. The valve periods between the opening and closing of the inlet valve (3 and 6 respectively) is denoted α, and between the opening and closing of the exhaust valve (2 and 5 respectively) is denoted β. The valve periods are determined from trials or previous experience and are not varied during engine operation.

It will be noted that the interval between the opening of the inlet valve at 3 in the exhaust stroke and the closing of the exhaust valve at 5 in the suction stroke, which constitutes the valve overlap, is considerable. Now while the effect of scavenging becomes more and more beneficial as the load on the engine increases, at low values of engine output a large scavenging overlap is not required and may indeed be detrimental.

Another characteristic of pressure-charging by means of an exhaust gas turbine is that with increase of engine output the energy recoverable from the exhaust gases exceeds that required for pre-compression of the air supply to the engine and that therefore usable energy may be wasted.

Figure 2:
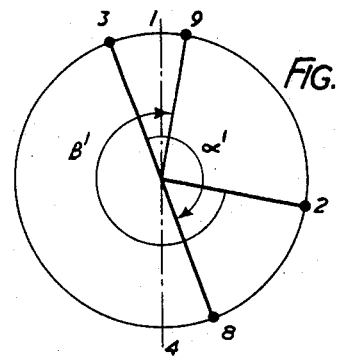

Referring now to Fig. 2, the same reference numerals have been used as in Fig. 1 with the exception of the closing of the inlet valve and exhaust valve which are denoted 8 and 9 respectively and the valve periods between the opening and closing of the inlet and exhaust valve which are denoted $\alpha'$ and $\beta'$ respectively. It will be noted that at starting and low load operation the inlet valve opens at the point 3 only slightly before the inner dead center on the exhaust stroke and closes at the point 8 approximately at the bottom dead center on the suction stroke. The exhaust valve opens at the point 2 considerably before the outer dead center on the expansion stroke and closes at the point 9 only slightly after the inner dead center on the suction stroke.

It will be seen that the valve overlap between the opening of the inlet valve at 3 and the closing of the exhaust valve at 9 is comparatively small; the expansion ratio, as determined by the arc between the inner dead center 1 and opening of the exhaust valve 2 is comparatively low, while the compression ratio as defined by the arc between the image of the point 8 about the line 1—4 on to the compression stroke and the inner dead center, is comparatively large. This leaves enough energy in the exhaust gases at low load operation to supply the exhaust gas turbine with sufficient energy for driving the compressor, while the high compression ratio ensures a pressure high enough for firing with atmospheric charging of the cylinder when starting.

Figure 3:
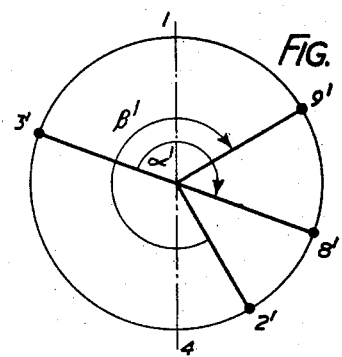

Referring now to Fig. 3, the inner and outer dead centers are referred to by numerals 1 and 4 and the valve periods by $\alpha'$ and $\beta'$ respectively as in Fig. 2, whilst the opening and closing of the inlet and exhaust valve respectively are 3', 8' and 2', 9' respectively.

It will be seen that the valve periods $\alpha'$ and $\beta'$ respectively are left unaltered, but that the points 3' and 8' at which the inlet valve opens and closes are advanced as compared with the points 3 and 8 of Fig. 2, whilst the points 2' and 9' at which the exhaust valve opens and closes respectively are retarded as compared with points 2 and 9 of Fig. 2. Accordingly the valve overlap between the points 3' and 9' of Fig. 3 is considerably increased as compared with that of Fig. 2, the expansion ratio as defined by the arc 1—2' is considerably increased and the compression ratio as defined by the arc between the image of point 8' about the line 1—4 and the inner dead center is considerably reduced.

Accordingly, at normal and full load operation, a large overlap is available for thoroughly scavenging the cylinder and cooling the exhaust gas turbine by the scavenging air, a high expansion ratio is available in the engine cylinder allowing high thermodynamic efficiency of the expansion stroke and leaving just sufficient energy in the exhaust gases for driving the exhaust gas turbine without unduly wasting energy; the compression ratio is reduced to such an extent as to safeguard against unduly high maximum cylinder pressures at full load.

Figure 4:
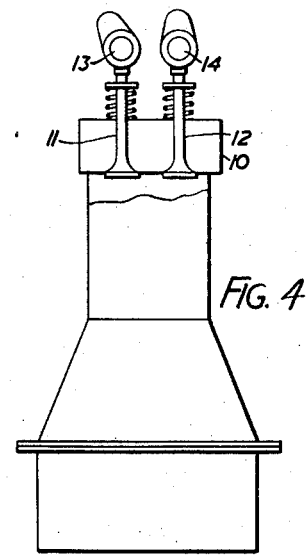

Referring now to Fig. 4, an inlet valve 11 and an exhaust valve 12 are shown to be arranged in the cylinder head 10 of a four-stroke cycle internal combustion engine. Separate cam-shafts 13, 14 are provided for the said valves 11, 12 respectively, and the relative angular position of these two cam-shafts can be adjusted in operation by means of a phasing unit (not shown in Fig. 4).

Figure 5:
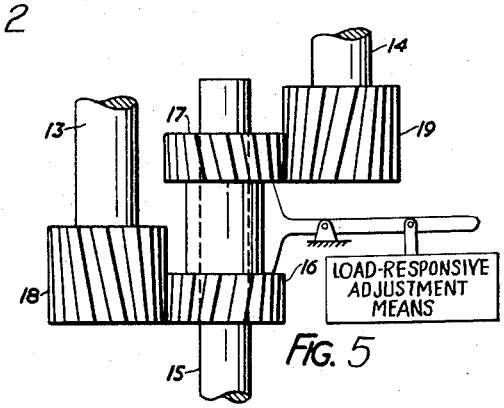
Fig. 5 shows, on a larger scale, a phasing unit which can be used for driving the separate cam-shafts of Fig. 4.

An embodiment of such a phasing unit is illustrated in Fig. 5. A shaft 15 driven from the engine crank-shaft carries in tandem arrangement a pair of helical gear pinions 16, 17 which are together slidable on splines or keys relative to, but coupled for rotation with, the said shaft 15. These pinions mesh with helical gears 18, 19, respectively, mounted on the cam-shaft 13 for the inlet valve 11 and on the cam-shaft 14 for the exhaust valve 12, respectively. The helical pinions 16 and 17 have right hand and left hand helical pitch, respectively, and consequently by sliding the two pinions 16, 17 together in the axial direction, the angular position of the cam-shafts 13 and 14 relative to one another is varied, one being advanced relative to the driving shaft 15, while the other is retarded, and vice versa.

Figures 6, 6A:
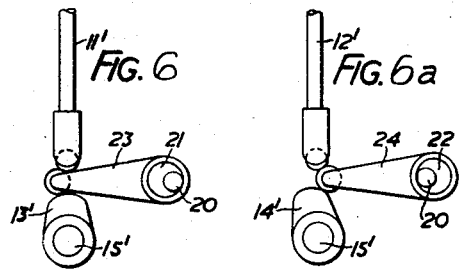
Figs. 6 and 6a show a cam and cam follower arrangement for the inlet and exhaust valve, respectively, the two cams being connected with one another at a fixed rotational offset.

Figs. 6 and 6a show another embodiment of phasing unit. A cam-shaft 15' common to the inlet and exhaust valves carries a cam 13' for the inlet valve and a cam 14' for the exhaust valve, acting on cam followers 23 and 24, respectively. These cam followers are mounted on eccentrics 21, 22, respectively, which are fixed with an angular offset on an adjustment shaft 20 common to them. These cam followers operate push rods 11', 12' for the inlet and exhaust valve, respectively.

By turning the adjustment shaft 20, the cam follower 23 is advanced relative to its associated cam 13' while the cam follower 24 is retarded relative to its associated cam 14', and vice versa.

The turning of the adjustment shaft 20 of Figs. 6 and 6a or the sliding of the pair of helical pinions 16, 17 of Fig. 5 can be derived automatically from the engine speed governor, or effected at will under the control of the operator.

Throughout the specification, where a single valve or cylinder is referred to or shown, a plurality of such valves or cylinders is included in the meaning of the term.

What I claim as my invention and desire to secure by Letters Patent is:

1. A pressure-charged four-stroke cycle internal combustion engine comprising in combination: an engine cylinder, a cylinder head fixedly connected to said cylinder, and having inlet and exhaust ports, inlet and exhaust valves spring biased to positions closing the said inlet and exhaust ports, respectively, a piston reciprocating in the said cylinder, cams operating the said inlet and exhaust valves, respectively, and operatively connected to the said piston, a gas turbine mechanically independent of the said piston and connected at its entry in fluid communication to the said exhaust port, a compressor coupled to the said turbine and connected at its discharge in fluid communication to the said inlet port, the said gas turbine forming at all load conditions including starting the only driving means of the said compressor, a phasing gear operatively connected between the said piston and cams, and load responsive adjustment means controlling the said phasing gear in the sense of retarding the opening of the said exhaust valve during the expansion stroke and the closing thereof at the beginning of the suction stroke of the said piston as the load on the engine increases from starting and low load operation to normal and full load operation.

2. A pressure-charged four-stroke cycle internal combustion engine as claimed in claim 1, wherein the said adjustment means additionally controls the said phasing gear in the sense of advancing the opening of the said inlet valve towards the end of the exhaust stroke and the closing thereof towards the end of the suction stroke of the said piston as the load on the engine increases from starting and low load operation to normal and full load operation.

3. A pressure-charged four-stroke cycle internal combustion engine as claimed in claim 2, wherein the valve period between the opening and closing of the said exhaust valve and the valve period between the opening and closing of the said inlet valve, respectively, are kept constant as the load of the engine varies.

4. A pressure-charged four-stroke cycle internal combustion engine as claimed in claim 2, comprising two separate cam-shafts operatively connected to the said piston one carrying the said cam operating the said inlet valve and the other one carrying the said cam operating the said exhaust valve, the said phasing gear angularly displacing the said two cam-shafts relative to one another in the sense of retarding the opening and closing of the said exhaust valve while advancing the opening and closing of the said inlet valve as the load on the engine increases from starting and low load operation to normal and full load operation.

5. A pressure-charged four-stroke cycle internal combustion engine as claimed in claim 2, comprising push rods operatively engaging the said valves, separate cam followers interposed between the said push rods and the said cams operating the said inlet valve and exhaust valve, respectively, the said cam followers being operatively connected to the said phasing gear and angularly adjusted by the same relative to their respective cams in the opposite sense, the opening and closing of the said exhaust valve being retarded and the opening and closing of the said inlet valve being advanced as the load on the engine increases from starting and low load operation to normal and full load operation.

6. A pressure-charged four-stroke cycle internal combustion engine as claimed in claim 5, wherein the said adjustment means comprise a common adjustment shaft, eccentrics angularly offset relative to one another on the said common adjustment shaft, the said cam followers for the said inlet valve and the said exhaust valve being mounted on the said eccentrics, respectively.

References Cited in the file of this patent

UNITED STATES PATENTS

| | | |
|---|---|---|
| 2,097,883 | Johansson | Nov. 2, 1937 |
| 2,142,621 | Tsuneda et al. | Jan. 3, 1939 |
| 2,401,188 | Prince | May 28, 1946 |
| 2,670,594 | Crooks | Mar. 2, 1954 |

FOREIGN PATENTS

| | | |
|---|---|---|
| 1,011,423 | France | Apr. 2, 1952 |